United States Patent
Zhao et al.

(10) Patent No.: US 11,938,684 B2
(45) Date of Patent: Mar. 26, 2024

(54) END EFFECTOR, WELDING SYSTEM, AND METHOD FOR WELDING COMPOSITE COMPONENTS

(71) Applicant: Rohr, Inc., Chula Vista, CA (US)

(72) Inventors: Wenping Zhao, Glastonbury, CT (US); John J. Gangloff, Jr., Middletown, CT (US); Michael A. Klecka, Coventry, CT (US); Zhigang Wang, South Windsor, CT (US); Abhijit Chakraborty, West Hartford, CT (US)

(73) Assignee: Rohr, Inc., Chula Vista, CA (US)

( * ) Notice: Subject to any disclaimer, the term of this patent is extended or adjusted under 35 U.S.C. 154(b) by 54 days.

(21) Appl. No.: 17/391,787

(22) Filed: Aug. 2, 2021

(65) Prior Publication Data
US 2023/0031155 A1    Feb. 2, 2023

(51) Int. Cl.
| | | |
|---|---|---|
| B29C 65/00 | (2006.01) | |
| B25J 11/00 | (2006.01) | |
| B25J 15/00 | (2006.01) | |
| B29C 65/32 | (2006.01) | |
| B29K 307/04 | (2006.01) | |
| H05B 6/10 | (2006.01) | |

(52) U.S. Cl.
CPC ............ B29C 66/82 (2013.01); B25J 11/005 (2013.01); B25J 15/0019 (2013.01); B29C 65/32 (2013.01); B29C 66/0342 (2013.01); B29C 66/721 (2013.01); B29C 66/7392 (2013.01); B29K 2307/04 (2013.01); H05B 6/105 (2013.01)

(58) Field of Classification Search
CPC ... B29C 65/32; B29C 66/0342; B29C 66/721; B29C 66/7392; B29C 66/82; B29C 70/38; B29C 70/382; B29C 70/384; B29C 70/386; B29C 70/388; B29K 2307/04; H05B 6/105; B25J 11/005; B25J 15/0019
See application file for complete search history.

(56) References Cited

U.S. PATENT DOCUMENTS

| | | | | |
|---|---|---|---|---|
| 2018/0297055 | A1* | 10/2018 | Chung | ................. B29C 70/504 |
| 2019/0322041 | A1* | 10/2019 | Manuel | ................ B29C 64/118 |
| 2019/0389148 | A1* | 12/2019 | Wadsworth | ....... B29C 66/81451 |
| 2020/0198258 | A1* | 6/2020 | Gallo | .................... B29C 66/863 |

(Continued)

FOREIGN PATENT DOCUMENTS

| | | | | | |
|---|---|---|---|---|---|
| DE | 102014001414 | A1 * | 8/2015 | ............. | B29C 70/38 |
| EP | 3772406 | A1 | 2/2021 | | |

(Continued)

OTHER PUBLICATIONS

Translation of DE-102014001414-A1, Aug. 2015, Apmann H (Year: 2015).*
EP search report for EP22177097.7 dated Dec. 5, 2022.

*Primary Examiner* — George R Koch
(74) *Attorney, Agent, or Firm* — Getz Balich LLC (57) ABSTRACT

An end effector for welding composite components includes an end effector housing and a welding member mounted to the end effector housing. The end effector further includes a leading roller mounted to the end effector housing forward of the welding member and at least one follower roller mounted to the end effector housing aft of the welding member. The end effector further includes at least one first cooling air jet positioned to direct a first stream of cooling air toward the at least one follower roller.

15 Claims, 7 Drawing Sheets

(56) References Cited

U.S. PATENT DOCUMENTS

| | | |
|---|---|---|
| 2021/0039326 A1* | 2/2021 | DiChiara .......... B29C 66/91655 |
| 2021/0039329 A1 | 2/2021 | Dichiara |
| 2021/0039332 A1 | 2/2021 | Dichiara |
| 2021/0039334 A1 | 2/2021 | Dichiara |
| 2021/0291292 A1* | 9/2021 | Seneviratne ........... B23K 13/02 |

FOREIGN PATENT DOCUMENTS

| | | |
|---|---|---|
| WO | 2015018801 A1 | 2/2015 |
| WO | 2020016514 A1 | 1/2020 |

* cited by examiner

END EFFECTOR, WELDING SYSTEM, AND METHOD FOR WELDING COMPOSITE COMPONENTS

This invention was made with government support under contract no. ARM-TEC-20-01-F06 awarded by the United States Army. The government has certain rights in the invention.

BACKGROUND

1. Technical Field

This disclosure relates generally to welding thermoplastic composite components and more particularly to systems and methods for controlling cooling and consolidation pressure during welding of thermoplastic composite components.

2. Background Information

Lightweight carbon fiber-reinforced thermoplastic composites ("TPCs") are structural materials that can be joined via fast heat fusion bonding/welding for large aircraft parts. Heat for melting a TPC component matrix at a joint interface can be applied by various means, such as by induction welding. A challenge of induction welding large TPC components is to generate fast, controlled, and uniform heating and cooling along an entire weld line between the TPC components, to produce a resultant high-strength joint. Accordingly, improved systems and methods for welding TPC components are needed.

SUMMARY

It should be understood that any or all of the features or embodiments described herein can be used or combined in any combination with each and every other feature or embodiment described herein unless expressly noted otherwise.

According to an aspect of the present disclosure, an end effector for welding composite components includes an end effector housing and a welding member mounted to the end effector housing. The end effector further includes a leading roller mounted to the end effector housing forward of the welding member and at least one follower roller mounted to the end effector housing aft of the welding member. The end effector further includes at least one first cooling air jet positioned to direct a first stream of cooling air toward the at least one follower roller.

In any of the aspects or embodiments described above and herein, the end effector further includes at least one second cooling air jet configured to direct a second stream of cooling air toward a surface of the composite components.

In any of the aspects or embodiments described above and herein, the at least one follower roller includes at least a first follower roller and a second follower roller.

In any of the aspects or embodiments described above and herein, the at least one first cooling air jet is positioned to direct the first stream of cooling air toward the first follower roller.

In any of the aspects or embodiments described above and herein, the first follower roller has a first diameter and the second follower roller has a second diameter which is smaller than the first diameter.

In any of the aspects or embodiments described above and herein, the end effector further includes a follower belt wrapped around the at least one follower roller and connecting each follower roller of the at least one follower roller.

In any of the aspects or embodiments described above and herein, the first follower roller is made of a first material and the second follower roller is made of a second material which is different than the first material.

In any of the aspects or embodiments described above and herein, the second material is harder than the first material.

In any of the aspects or embodiments described above and herein, one or both of the leading roller and the at least one follower roller are mounted to the end effector housing with a force control member configured to bias the one or both of the leading roller and the at least one follower roller in a bias direction away from the end effector housing.

In any of the aspects or embodiments described above and herein, the welding member is an induction welding member.

In any of the aspects or embodiments described above and herein, the end effector further includes a follower shoe mounted to the end effector housing aft of the at least one follower roller. The follower shoe includes a contact surface facing away from the end effector housing.

In any of the aspects or embodiments described above and herein, one or both of the leading roller and the at least one follower roller has a non-constant diameter.

According to another aspect of the present disclosure, a welding system includes a welding fixture configured to retain a stack of adjacent composite components, a robotic arm which is movable relative to the welding fixture, and an end effector mounted to a distal end of the robotic arm. The end effector includes an end effector housing and a welding member mounted to the end effector housing. The end effector further includes a leading roller mounted to the end effector housing forward of the welding member and configured to roll along a surface of the stack. The end effector further includes at least one follower roller mounted to the end effector housing aft of the welding member and configured to roll along the surface of the stack. The end effector further includes at least one first cooling air jet configured to direct a stream of cooling air toward the at least one follower roller.

In any of the aspects or embodiments described above and herein, the at least one follower roller includes at least a first follower roller and a second follower roller.

In any of the aspects or embodiments described above and herein, the first follower roller has a first diameter and the second follower roller has a second diameter which is smaller than the first diameter.

In any of the aspects or embodiments described above and herein, the end effector further includes a follower belt wrapped around the at least one follower roller and connecting each follower roller of the at least one follower roller.

In any of the aspects or embodiments described above and herein, the first follower roller is made of a first material and the second follower roller is made of a second material which is harder than the first material.

According to another aspect of the present disclosure, a method for welding composite components includes welding adjacent composite components by heating a joint portion of the adjacent composite components with a welding member in a welding direction. The method further includes applying pressure, with a leading roller, to the adjacent composite components forward of the welding member in the welding direction. The method further includes applying pressure, with the at least one follower roller, to the adjacent composite components aft of the welding member in the welding direction. The method further includes cooling the at least one follower roller by directing a first stream of cooling air toward the at least one follower roller.

In any of the aspects or embodiments described above and herein, the method further includes cooling the joint portion by directing a second stream of cooling air toward the joint portion.

In any of the aspects or embodiments described above and herein, the at least one follower roller includes at least a first follower roller and a second follower roller and cooling the at least one follower roller includes directing the first stream of cooling air toward the first follower roller.

The present disclosure, and all its aspects, embodiments and advantages associated therewith will become more readily apparent in view of the detailed description provided below, including the accompanying drawings.

DETAILED DESCRIPTION

Figure 1:
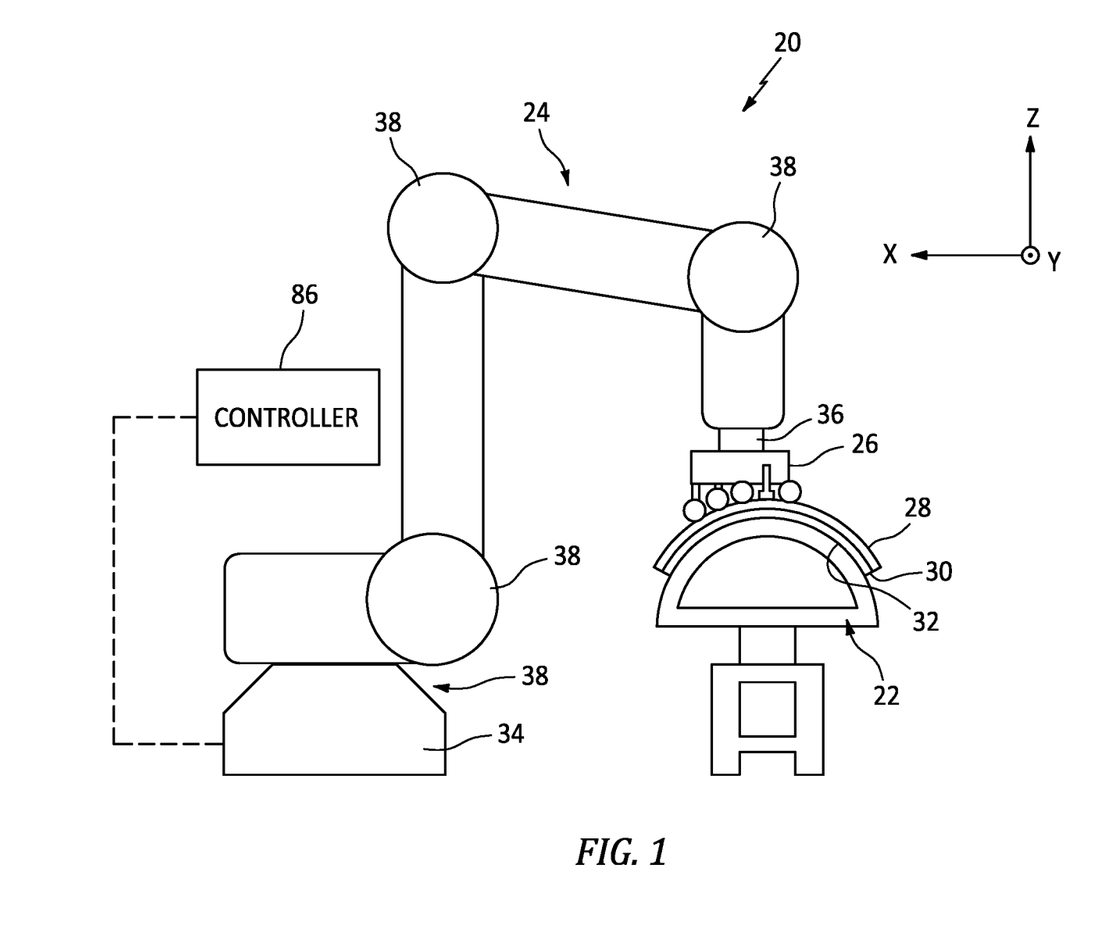
FIG. 1 illustrates a schematic side view of a welding system, in accordance with one or more embodiments of the present disclosure.

Referring to FIG. 1, the present disclosure includes a welding system 20 configured for welding together components such as, but not limited to, thermoplastic composite ("TPC") components. Non-limiting examples of TPC component thermoplastic materials includes, for example, polyetheretherketone (PEEK), polyetherketoneketone (PEKK), PAEK (polyaryletherketone), PPS (polyphenylene sulfide), PEI (polyetherimide), or other suitable thermoplastic materials and the present disclosure is not limited to a particular thermoplastic material. For ease of description, the TPC components are described below as carbon-fiber reinforced thermoplastic components. The present disclosure, however, is not limited to such a configuration of the TPC components. The welding system 20 generally includes a welding fixture 22, a robotic arm 24, and an end effector 26.

The welding fixture 22 is configured for securely retaining a plurality of TPC components, such as a first TPC component 28 and a second TPC component 30, in position for a welding process. The welding fixture 22 includes a support surface 32 for supporting the TPC components 28, 30. While the welding fixture 22 is illustrated in FIG. 1 as having a generally convex support surface 32, it should be understood that the support surface 32 may be planar, curved, or otherwise contoured as required for the particular TPC components to be welded and without departing from the scope of the present disclosure.

The robotic arm 24 includes a base end 34, a distal end 36, and one or more moveable joints 38 allowing the robotic arm 24 to move relative to the welding fixture 22, for example by translating in one or more of an x-, a y-, and a z-axis and/or rotating about one or more of the x-, the y-, and the z-axis. The robotic arm 24 is connected to the end effector 26 at the distal end 36 and is configured to position the end effector 26 in contact with a weld surface 40 of the TPC components 28, 30 and to move the end effector 26 along the weld surface 40 in a welding direction W. As used herein, the term "weld surface" refers to an outer surface of the positioned TPC components 28, 30 which the end effector 26 traverses to form a weld line joining the TPC components 28, 30. While the end effector 26 is described herein as being connected to and moved by the robotic arm 24, it should be understood that the present disclosure is not limited to this particular configuration and the end effector 26 may be moved or otherwise controlled by other types of mechanical or robotic systems.

Referring to FIGS. 2-5, the end effector 26 includes a housing 42 having a first housing side 44 mounted to the distal end 36 of the robotic arm 24 and a second housing side 46 opposite the first housing side 44. The first housing side 44 and the second housing side 46 extend between a forward housing end 48 and an aft housing end 50.

The end effector 26 includes a welding member 52 mounted to the housing 42 at the second housing side 46 and projecting outward from the second housing side 46. The welding member 52 is configured to heat the first TPC component 28 and the second TPC component 30, thereby melting the TPC components 28, 30 and welding the TPC components 28, 30 together. The welding member 52 may be configured for induction welding, ultrasonic welding, resistance welding, etc. and the present disclosure is not limited to a particular configuration of the welding member 52. For ease of description, the welding member 52 is described herein as an induction welding member. The welding member 52 includes an induction coil 54 configured to form an alternating electromagnetic field (schematically illustrated in FIGS. 2-5 as electromagnetic field 56).

Figure 2:
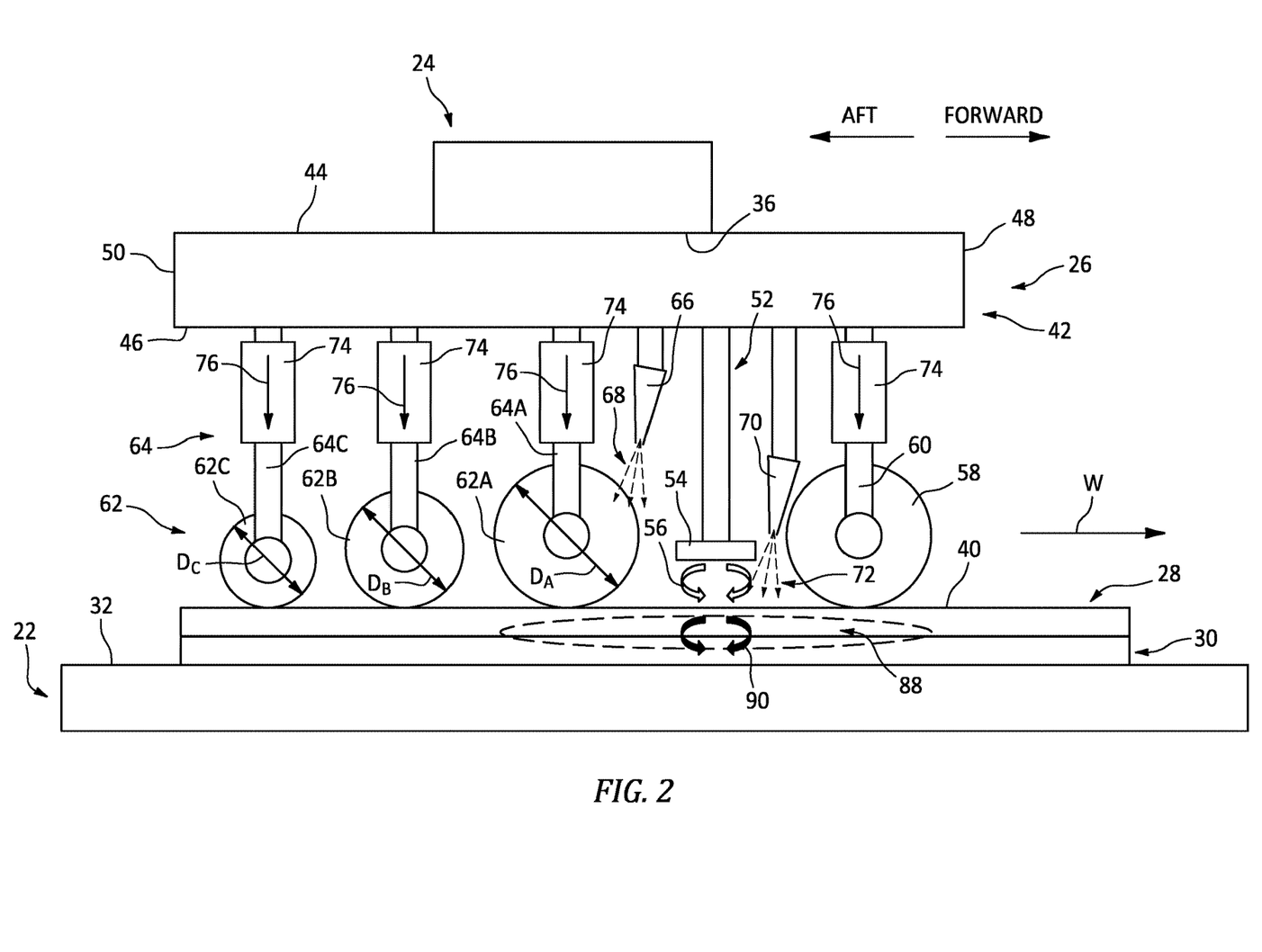
FIG. 2 illustrates a schematic side view of an end effector for the welding system of FIG. 1, in accordance with one or more embodiments of the present disclosure.

The end effector 26 includes a leading roller 58 mounted to the housing 42 at the second housing side 46 by a roller arm 60 projecting outward from the second housing side 46. The leading roller 58 is located forward of the welding member 52. As used herein, the terms "forward" and "aft" are used to refer to the orientation of the end effector 26 in which the end effector contacts the weld surface 40 and proceeds in the welding direction W along the weld surface 40 when used in a conventional manner. The leading roller 58 has a generally cylindrical shape and is configured to rotate with respect to the roller arm 60 so as to roll across the weld surface 40. While the end effector 26 is illustrated in FIG. 2 as having a single roller (e.g., the leading roller 58) forward of the welding member 52, the present disclosure is not limited to this particular configuration and, in various embodiments, the end effector 26 may include more than one roller located forward of the welding member 52.

The end effector 26 includes at least one follower roller 62 mounted to the housing 42 at the second housing side 46 by a respective at least one roller arm 64 projecting outward from the second housing side 46. The at least one follower roller 62 is located aft of the welding member 52. Like the leading roller 58, the at least one follower roller 62 has a generally cylindrical shape and is configured to rotate with respect to the respective at least one roller arm 64 so as to roll across the weld surface 40. In various embodiments, the at least one follower roller 62 may include a plurality of follower rollers, as shown in FIGS. 2-5, such as a first follower roller 62A, a second follower roller 62B, and a third follower roller 62C each mounted to the housing 42 by a respective first roller arm 64A, second roller arm 64B, and third roller arm 64C. As used herein, the terms "first," "second," "third," etc. with respect to the at least one follower roller 62 and at least one roller arm 64 refer to the order of the at least one follower roller 62 and at least one roller arm 64 in a forward to aft direction (e.g., the first follower roller 62A is the forward-most follower roller. The present disclosure in not limited to any particular quantity of the at least one follower roller 62 and the quantity of the at least one follower roller 62 may be selected, for example, based on the size, shape, and/or configuration of the particular TPC components 28, 30 to be welded.

In various embodiments, and where the at least one follower roller 62 includes a plurality of follower rollers, the follower rollers of the at least one follower roller 62 may have varying diameters. For example, as shown in FIG. 2, the diameters of the at least one follower roller 62 may decrease in a forward to aft direction such that a diameter DA of the first follower roller 6A is greater than a diameter DB of the second follower roller 62B, which is greater than a third diameter Dc of the third follower roller 62C. However, in various other embodiments, two or more follower rollers of the at least one follower roller 62 may have a same diameter.

Figure 2A:
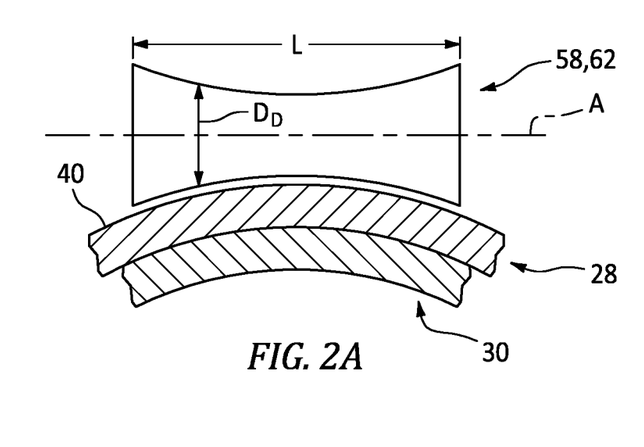
FIGS. 2A and 2B illustrate cross-sectional view of embodiments of the end effector of FIG. 2 having a non-constant roller diameter, in accordance with one or more embodiments of the present disclosure.
Figure 2B:
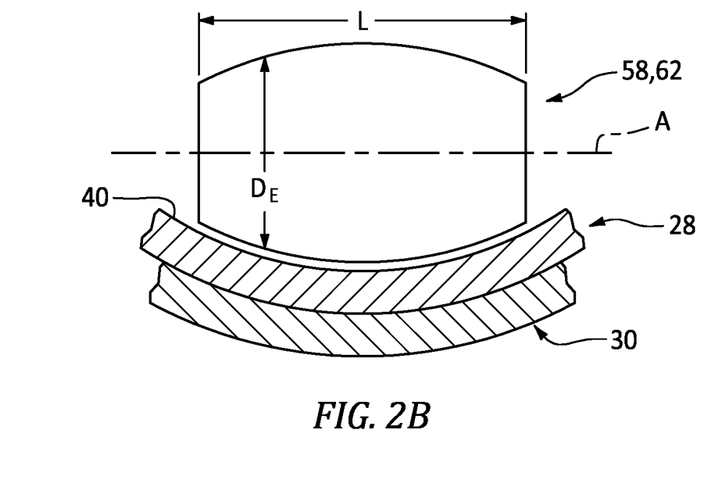

As shown in FIGS. 2A and 2B, in various embodiments, the leading roller 58 and/or the at least one follower 62 of the end effector 26 may have a "non-constant diameter" to provide more uniform pressure to components having complex curvature. FIG. 2A illustrates a roller 58, 62 having a diameter DD which varies along a length L of the roller 58, 62 with respect to a rotational axis A of the roller 58, 62. For example, the non-constant diameter DD of the roller 58, 62 of FIG. 2A defines a substantially concave shape of the roller 58, 62 which corresponds to a substantially convex weld surface 40 of the TPC components 28, 30. FIG. 2B illustrates a roller 58, 62 having a diameter DE which varies along the length L of the roller 58, 62. For example, the non-constant diameter DE of the roller 58, 62 of FIG. 2B defines a substantially convex shape of the roller 58, 62 which corresponds to a substantially concave weld surface 40 of the TPC components 28, 30. The present disclosure is not limited to the non-constant diameter rollers illustrates in FIGS. 2A and 2B, and rollers 58, 62 having various non-constant diameters or constant diameters may be selected for the conditions of the particular composite welding process.

The end effector 26 includes at least one first cooling air jet 66 positioned to direct a first stream of cooling air 68 toward the at least one follower roller 62, thereby cooling the at least one follower roller 62. The at least one first cooling air jet 66 may be mounted to the housing 42 at the second housing side 46 and project outward from the second housing side 46. For example, as shown in FIG. 2, the at least one first cooling air jet 66 may be positioned between the welding member 52 and the first follower roller 62A to direct the first stream of cooling air 68 toward the first follower roller 62A. In various embodiments, the at least one first cooling air jet 66 may include a plurality of first cooling air jets with one or more first cooling air jets configured to direct cooling air toward one or more of the at least one follower roller 62.

In various embodiments, the end effector 26 may include at least one second cooling air jet 70 configured to direct a second stream of cooling air 72 toward the weld surface 40 of the TPC components 28, 30. As shown in FIG. 2, the at least one second cooling air jet 70 may be positioned between the welding member 52 and the leading roller 58 in order to direct the second stream of cooling air 72 toward the weld surface 40 forward of the welding member 52. However, in various embodiments, the at least one second cooling air jet 70 may be positioned at one or more additional and/or alternative locations to directly cool the weld surface 40.

In various embodiments, one or both of the leading roller 58 and the at least one follower roller 62 may be mounted to the housing 42 with a force control member 74 configured to bias the one or both of the leading roller 58 and the at least one follower roller 62 in a bias direction 76 away from the housing 42. The force control members 74 may be included in the roller arms 60, 64 for mounting the respective leading roller 58 and at least one follower roller 62 to the housing 42. The force control members 74 may be configured for use with springs or with hydraulic or pneumatic control to provide the biasing force for the rollers 58, 62. In various embodiments, the force control members 74 may provide different degrees of biasing force to different rollers such as the leading roller 58 and the at least one follower roller 62, 62A, 62B, 62C.

In order to prevent the induction of electrical eddy currents in end effector 26 materials by the electromagnetic field 56 of the welding member 52, end effector 26 components, particularly those in proximity to the welding member 52, may be made from non-magnetic materials. For example, components of the end effector 26, such as the housing 42, rollers 58, 62, roller arms 60, 64, cooling air jets 66, 70, and/or the force control members 74 may be made from non-magnetic materials including, but not limited to, non-magnetic metals and metal alloys including aluminum and titanium, polymeric materials, ceramic materials, etc.

Figure 3:
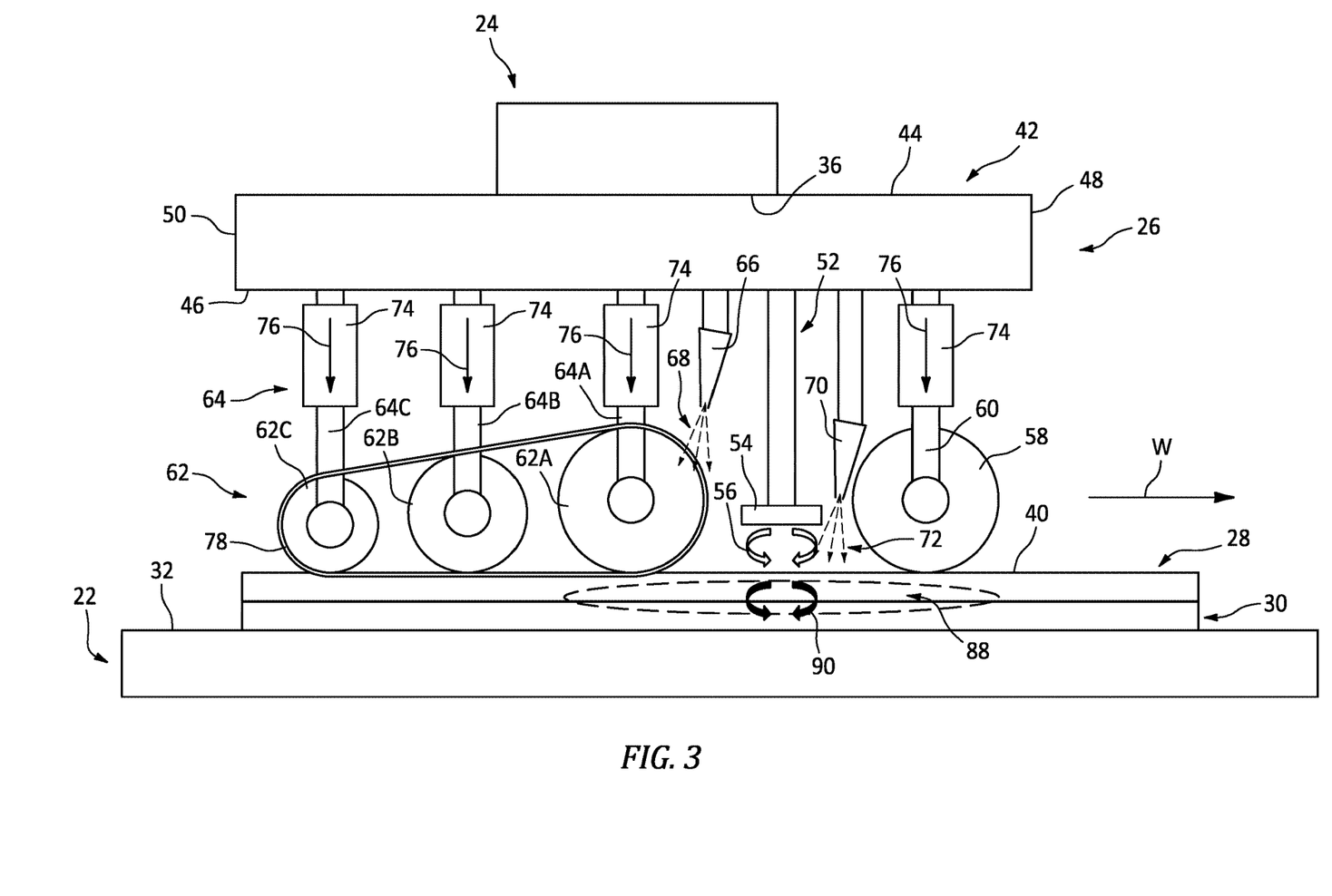
FIG. 3 illustrates a schematic side view of an end effector for the welding system of FIG. 1, in accordance with one or more embodiments of the present disclosure.

Referring to FIG. 3, in various embodiments, the end effector 26 further includes a follower belt 78 wrapped around the at least one follower roller 62 and connecting each follower roller of the at least one follower roller 62 (e.g., the first follower roller 62A, the second follower roller 62B, and the third follower roller 62C). The at least one first cooling air jet 66 may be positioned to direction the first stream of cooling air 68 toward the follower belt 78, thereby cooling the follower belt 78.

Figure 4:
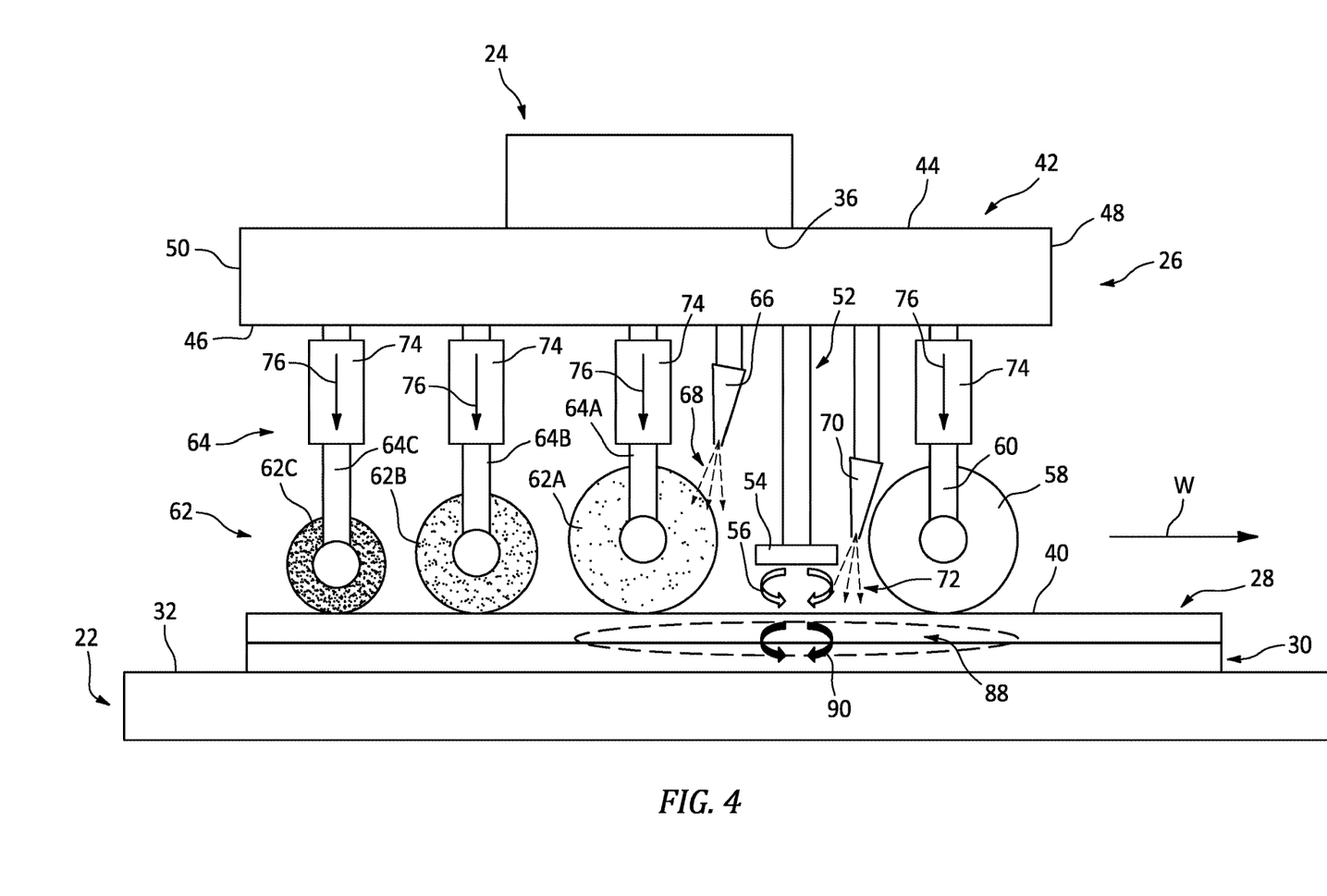
FIG. 4 illustrates a schematic side view of an end effector for the welding system of FIG. 1, in accordance with one or more embodiments of the present disclosure.

Referring to FIG. 4, in various embodiments, one or more of the at least one follower roller 62 may be made from or include an elastomeric material. In various embodiments, and where the at least one follower roller 62 includes a plurality of follower rollers, the follower rollers of the at least at least one follower roller 62 may be made from different materials which may be tailored to control the consolidation pressure applied to the TPC components 28, 30 during a welding process. For example, the first follower roller 62A may be made from a first material, the second follower roller 62B may be made from a second material which is different than the first material, and the third follower roller 62C may be made from a third material which is different than one or both of the first material and the second material. In various embodiments, to provide increasing levels of consolidation pressure as the end effector 26 proceeds across the weld surface 40 in the weld direction W, the third material may be harder than the second material, which may, in turn, be harder than the first material. Alternatively, in various embodiments, the follower rollers of the at least one follower roller 62 may be made from a same material, which same material may be configured with varying levels of hardness, for example, with the hardness of each follower roller material increasing in a forward to aft direction. Non-limiting examples of materials for the at least one follower roller 62, in addition to those previously discussed, include elastomeric materials such as rubber or high-temperature silicone of varying hardness and for relatively harder materials may also include metals and metal alloys.

Figure 5:
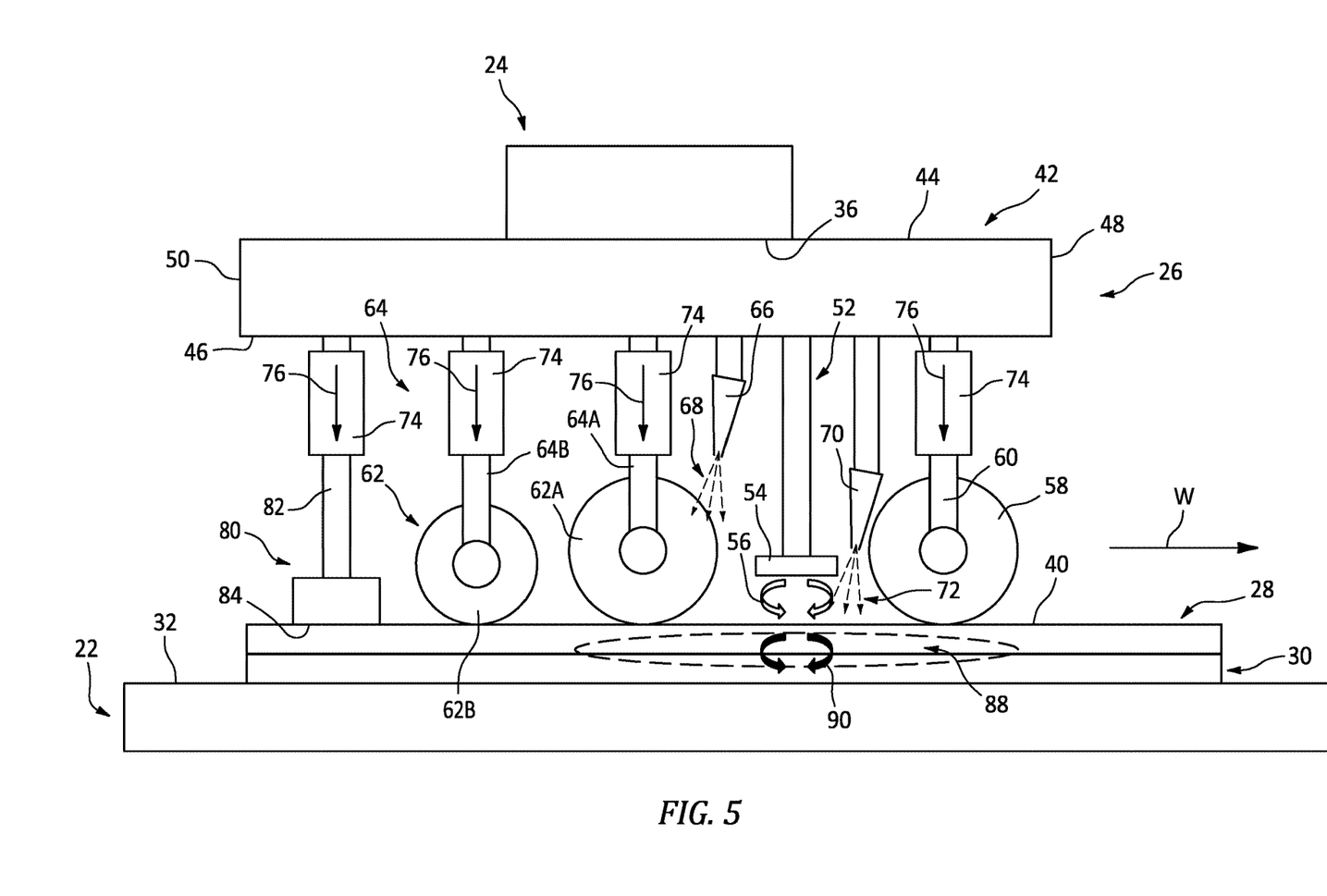
FIG. 5 illustrates a schematic side view of an end effector for the welding system of FIG. 1, in accordance with one or more embodiments of the present disclosure.

Referring to FIG. 5, in various embodiments, the end effector 26 includes a follower shoe 80 mounted to the housing 42 at the second housing side 46 by a shoe arm 82 projecting outward from the second housing side 46. The follower shoe 80 may be located aft of the at least one follower roller 62. Like the rollers 58, 62, the follower shoe 80 may be mounted to the housing 42 with the force control members 74 configured to bias the follower shoe 80 in the bias direction 76 away from the housing 42. The force control members 74 may be included in the shoe arm 82 for mounting the follower shoe 80 to the housing 42. The follower shoe 80 may be fixed relative to the shoe arm 82 and may include a generally flat contact surface 84 facing away from the housing 42 and configured to slide across the weld surface 40 as the end effector 26 moves in the welding direction W.

Referring to FIGS. 1-5, the present disclosure welding system 20 may include a controller 86 in communication with one or more of the components (e.g., robotic arm 24, welding member 52, at least one first cooling air jet 66, at least one second cooling air jet 70, force control members 74, etc.) that may be present in the various embodiments of the present disclosure welding system 20. The controller 86 may be configured to execute stored instructions (e.g., algorithmic instructions) that cause the welding system 20 to perform steps or functions described herein. The controller 86 may include any type of computing device, computational circuit, or any type of process or processing circuit capable of executing a series of instructions that are stored in memory. The controller 86 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory may represent one or more algorithms for controlling the welding system 20 as described herein, and the stored instructions are not limited to any particular form (e.g., program files, system data, buffers, drivers, utilities, system programs, etc.) provided they can be executed by the controller 86. The controller 86 memory may be a non-transitory machine-readable storage medium configured to store instructions that when executed by one or more processors, cause the one or more processors to perform or cause the performance of certain functions. The memory may be a single memory device or a plurality of memory devices. The present disclosure controller 86 is not limited to any particular type of memory device. One skilled in the art will appreciate, based on a review of this disclosure, that the implementation of the controller 86 may be achieved via the use of hardware, software, firmware, or any combination thereof. Communications between welding system 20 components may be by wired connection or may be by wireless communication, or any combination thereof.

Figure 6:
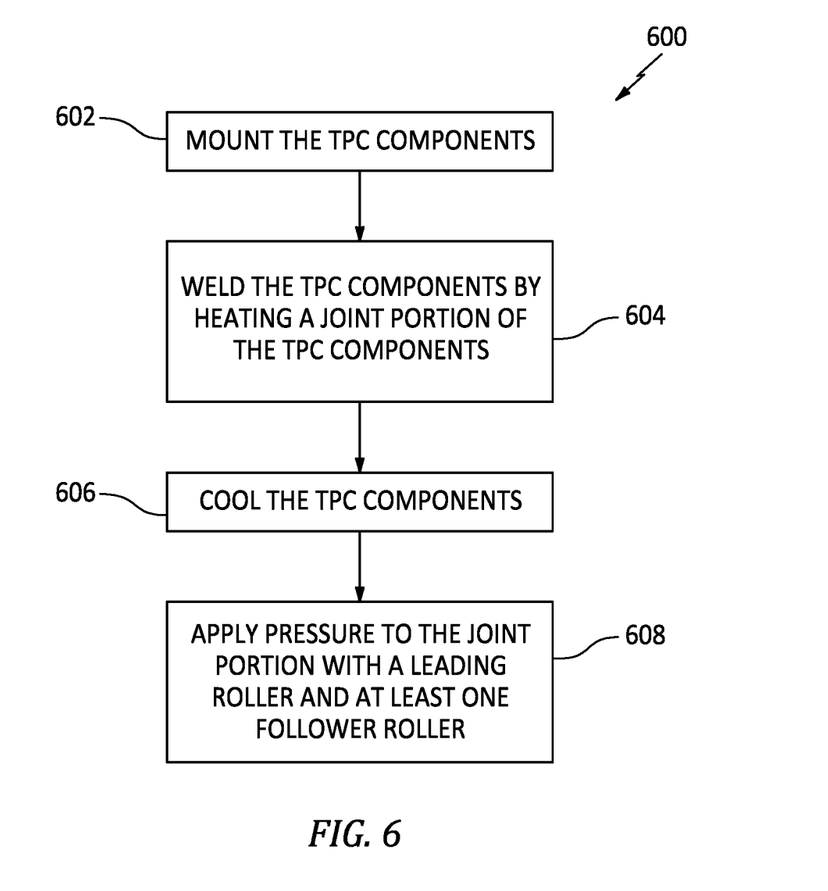
FIG. 6 illustrates a flow chart of a method for welding adjacent composite components, in accordance with one or more embodiments of the present disclosure.

Referring to FIGS. 1-6, the present disclosure includes a method 600 for welding composite components, as shown in the flow chart illustrated in FIG. 6. For ease of description, the method 600 is described below with reference to the welding system 20 of FIG. 1 and the end effector 26 of FIGS. 2-5. The method 600, however, may alternatively be performed with other welding systems or end effector configurations. Unless otherwise noted herein, it should be understood that the steps of method 600 are not required to be performed in the sequence in which they are discussed below and, in various embodiments, steps of method 600 may be performed separately or simultaneously.

In step 602, TPC components, such as the TPC components 28, 30, may be mounted together in preparation for welding. For example, as shown in FIG. 1, the TPC components 28, 30 may be assembled on the welding fixture 22 as a stack of adjacent TPC components. However, the TPC components 28, 30 may be secured or positioned relative to one in any fashion so as to form a desired joint portion 88 of the TPC components 28, 30 (e.g., the portion of the TPC components 28, 30 which will be melted, thereby welding the TPC components 28, 30 together).

In step 604, the TPC components 28, 30 are welded together by heating the joint portion 88 of the TPC components 28, 30. As previously discussed, the welding member 52 may be an induction welding member including the induction coil 54 which produces the alternating electromagnetic field 56. The TPC components 28, 30 include carbon fibers oriented within a thermoplastic material matrix. The carbon fibers may be unidirectional or woven, for example, and the present disclosure is not limited to any particular orientation of the carbon fibers. The alternating electromagnetic field 56 induces electrical eddy currents (schematically illustrated in FIGS. 2-5 as eddy currents 90) in the inherently conductive carbon fibers of the TPC components 28, 30, thereby producing heat which melts the thermoplastic material of the TPC components 28, 30 at the joint portion 88. The end effector 26 is moved along the weld surface 40 of the TPC components 28, 30 by the robotic arm 24 in the weld direction W so as to form a weld line joining the first TPC component 28 to the second TPC component 30. The robotic arm 24 may translate and rotate the end effector 26 in three-dimensional space to accommodate large-area complex curvatures of the TPC components 28, 30. The weld line between the TPC components 28, 30 may be straight, curved, or any other pattern.

Thermoplastic materials such as those used for TPC components 28, 30 may have crystalline lattice structures which contribute to the desired strength, stiffness, and temperature stability characteristics of the thermoplastic materials. When melted, during the welding process, the crystalline lattice structures of the thermoplastic materials may break down allowing the respective thermoplastic materials of the TPC components 28, 30 to blend. If the melted thermoplastic materials of the TPC components 28, 30 are cooled too quickly or are allowed to move excessively during cooling, the crystalline lattice structure of the thermoplastic materials at the joint portion 88 may not fully develop, potentially resulting in a low-strength weld joint. To maintain the crystalline lattice structure of the TPC components 28, 30, it may be desirable to concentrate heat from the welding member 52 at the joint portion 88 and to avoid overheating surrounding portions of the TPC components 28, 30. For example, during inductive welding, a surface of the TPC components 28, 30 closest to the welding member 52 (e.g., the weld surface 40) may heat up faster than the interface between the TPC components 28, 30 at the joint portion 88.

In step 606, the TPC components 28, 30 are cooled to control the temperature and cooling rate of the TPC components 28, 30 during the welding process. The at least one second cooling air jet 70 may be used to direct the second stream of cooling air 72 toward the weld surface 40 of the TPC components 28, 30, for example, at or immediately forward of the location of the induction coil 54 of the welding member 52. Accordingly, the at least one second cooling air jet 70 may directly cool the weld surface 40 of the TPC components 28, 30 in order to limit the heating of the first TPC component 28 by the welding member 52 proximate the weld surface 40.

The at least one first cooling air jet 66 may be used to direct the first stream of cooling air 68 toward the at least one follower roller 62. A plurality of first cooling air jets 66 may be used to strategically cool different portions of the end effector 26, for example, by directing each of the plurality of first cooling air jets 66 in a different direction, toward a different component, or toward a different portion of a component. The present disclosure is not limited to any particular configuration of the at least one first cooling air jet 66 and the at least one first cooling air jet 66 configuration may selected or modified for the particular welding application. By cooling the at least one follower roller 62 with the first stream of cooling air 68, the at least one follower roller 62 acts as a heat sink which continuously cools the joint portion 88 of the TPC components 28, 30 with a sufficient residence time to yield a stronger weld at the joint portion 88. In other words, the use of the at least one follower roller 62 as a heat sink to cool the joint portion 88 may provide slower and more consistent cooling of the joint portion 88 in comparison to other known methods of directly cooling welded TPC components. In various embodiments including the follower belt 78 shown in FIG. 3, cooling of the follower belt 78 by the at least one cooling air jet 66 may provide more continuous cooling of the joint portion 88 over a larger distance aft of the welding member 52, thereby potentially yielding improved thermoplastic lattice crystallization of the joint portion 88. The at least one first cooling air jet 66 and the at least one second cooling air jet 70 may use a working gas such as compressed air or other gas to provide the respective first stream of cooling air 68 and second stream of cooling air 72.

In step 608, the end effector 26 applies pressure to the joint portion 88 of the TPC components 28, 30 with the leading roller 58 and the at least one follower roller 62. The leading roller 58 provides preloading pressure to the joint portion 88 of the TPC components 28, 30 for weld line stability. The at least one follower roller 62 and, for example, the first follower roller 62A, second follower roller 62B, and third follower roller 62C shown in FIGS. 2-4, provide consolidation pressure over an extended distance aft of the welding member 52. In various embodiments, varying diameters (e.g., DA, DB, Dc) of the at least one follower roller 62 allow tailoring of the consolidation pressure. A larger diameter roller of the at least one follower roller 62 may present a greater contact area with the weld surface 40 and, hence, a lower pressure applied to the joint portion 88 in comparison to a relatively smaller diameter roller of the at least one follower roller 62. Because the temperature and quantity of melted thermoplastic material may be greater directly aft of the welding member 52, it may be desirable to gradually increase the consolidation pressure applied by the at least one follower roller 62 in a forward to aft direction to provide greater stability to the cooling joint portion 88. The force control members 74 biasing the leading roller 58 and the at least one follower roller 62 in a direction away from the housing 42 allow the end effector 26 to maintain consistent pressure on the joint portion 88 of the TPC components 28, 30 and accommodate local changes in TPC component 28, 30 height or curvature.

In various embodiments including the follower belt 78 shown in FIG. 3, the follower belt 78 may provide the consolidation pressure to the joint portion 88 of the TPC components 28, 30 aft of the welding member 52. The increased contact area of the follower belt 78 may provide a smoother consolidation pressure along the weld line and over changes in weld line topology (e.g., composite ply drops, complex curves), for example, in comparison to embodiments without the follower belt 78. Additionally, in various embodiments of the end effector 26 having dissimilar-material rollers of the at least one follower roller 62, the dissimilar-material rollers may provide varying levels of stiffness and deformation against the heated joint portion 88 of the TPC components 28, 30. Accordingly, use of dissimilar-material rollers, as previously described, may allow improved tuning of the at least one follower roller 62 consolidation pressure profile and minimize porosity in the resultant welded thermoplastic material of the TPC components 28, 30.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. An end effector for welding composite components, the end effector comprising:
    an end effector housing extending in a welding direction between and to a forward housing end and an aft housing end;
    an induction welding member mounted to the end effector housing, the induction welding member including an induction coil;
    a leading roller mounted to the end effector housing forward of the induction coil in the welding direction;
    at least one follower roller, each follower roller of the at least one follower roller mounted to the end effector housing aft of the induction coil in the welding direction, the at least one follower roller including a first follower roller disposed adjacent the induction welding member such that the induction coil is disposed between the leading roller and the first follower roller in the welding direction; and
    at least one first cooling air jet disposed between the induction welding member and the first follower roller in the welding direction, the at least one first cooling air jet positioned to direct a first stream of cooling air toward and onto the first follower roller.

2. The end effector of claim 1, further comprising at least one second cooling air jet configured to direct a second stream of cooling air toward a surface of the composite components.

3. The end effector of claim 1, wherein the at least one follower roller further includes a second follower roller.

4. The end effector of claim 3, wherein the first follower roller has a first diameter and the second follower roller has a second diameter which is smaller than the first diameter.

5. The end effector of claim 3, further comprising a follower belt wrapped around the at least one follower roller and connecting each follower roller of the at least one follower roller.

6. The end effector of claim 3, wherein the first follower roller is made of a first material and the second follower roller is made of a second material which is different than the first material.

7. The end effector of claim 6, wherein the second material is harder than the first material.

8. The end effector of claim 1, wherein one or both of the leading roller and the at least one follower roller are mounted to the end effector housing with a force control member configured to bias the one or both of the leading roller and the at least one follower roller in a bias direction away from the end effector housing.

9. The end effector of claim 1, further comprising a follower shoe mounted to the end effector housing aft of the at least one follower roller, the follower shoe including a contact surface facing away from the end effector housing.

10. The end effector of claim 1, wherein one or both of the leading roller and the at least one follower roller has a non-constant diameter.

11. A welding system comprising:
    a welding fixture configured to retain a stack of adjacent composite components;
    a robotic arm which is movable relative to the welding fixture; and
    an end effector mounted to a distal end of the robotic arm, the end effector comprising:
        an end effector housing extending in a welding direction between and to a forward housing end and an aft housing end;
        an induction welding member mounted to the end effector housing, the induction welding member including an induction coil;
        a leading roller mounted to the end effector housing forward of the induction coil in the welding direction and configured to roll along a surface of the stack;
        at least one follower roller, each follower roller of the at least one follower roller mounted to the end effector housing aft of the induction coil in the welding direction, the at least one follower roller including a first follower roller disposed adjacent the induction welding member such that the induction coil is disposed between the leading roller and the first follower roller in the welding direction, the first follower roller including a rolling surface configured to roll along the surface of the stack; and
        at least one first cooling air jet disposed between the induction welding member and the first follower roller in the welding direction, the at least one first cooling air jet configured to direct a stream of cooling air toward and onto the rolling surface.

12. The welding system of claim 11, wherein the at least one follower roller includes a second follower roller.

13. The welding system of claim 12, wherein the first follower roller has a first diameter and the second follower roller has a second diameter which is smaller than the first diameter.

14. The welding system of claim 12, wherein the end effector further comprises a follower belt wrapped around the at least one follower roller and connecting each follower roller of the at least one follower roller.

15. The welding system of claim 12, wherein the first follower roller is made of a first material and the second follower roller is made of a second material which is harder than the first material.

* * * * *